United States Patent
Jonnekin et al.

(10) Patent No.: US 12,546,222 B2
(45) Date of Patent: Feb. 10, 2026

(54) MECHANICAL ASSEMBLY FOR THE TRANSMISSION OF AXIAL FORCES BETWEEN AT LEAST TWO ROTOR PARTS OF A TURBOMACHINE AND METHOD FOR PRODUCING A VARIABLE THREADING FOR SUCH AN ASSEMBLY

(71) Applicant: SAFRAN AIRCRAFT ENGINES, Paris (FR)

(72) Inventors: Louis Edouard Jonnekin, Moissy-Cramayel (FR); Alessandro Allora, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 972 days.

(21) Appl. No.: 17/266,202

(22) PCT Filed: Aug. 5, 2019

(86) PCT No.: PCT/FR2019/051902
§ 371 (c)(1),
(2) Date: Feb. 5, 2021

(87) PCT Pub. No.: WO2020/030873
PCT Pub. Date: Feb. 13, 2020

(65) Prior Publication Data
US 2021/0262347 A1    Aug. 26, 2021

(30) Foreign Application Priority Data
Aug. 6, 2018   (FR) ........................................ 1857321

(51) Int. Cl.
*F01D 5/02*   (2006.01)
*F16B 39/30*   (2006.01)

(52) U.S. Cl.
CPC .............. *F01D 5/026* (2013.01); *F16B 39/30* (2013.01); *F05D 2220/30* (2013.01); *F05D 2240/60* (2013.01); *F05D 2260/31* (2013.01)

(58) Field of Classification Search
CPC . F01D 5/023; F01D 5/10; F01D 5/026; F01D 5/26; F16B 31/06; F16B 39/30; F05D 2260/31
See application file for complete search history.

(56) References Cited

U.S. PATENT DOCUMENTS 5,537,814 A * 7/1996 Nastuk ..................... F01D 5/066
                                                    60/805
5,779,416 A * 7/1998 Sternitzky ............. F16B 35/041
                                                    411/938

(Continued)

FOREIGN PATENT DOCUMENTS

FR    2975449 A1   11/2012
GB    2074280 A    10/1981

OTHER PUBLICATIONS

Written Opinion of the International Searching Authority and International Search Report, dated Nov. 22, 2019, for International Application No. PCT/FR2019/051902, with English translations.

*Primary Examiner* — Courtney D Heinle
*Assistant Examiner* — Cameron A Corday
(74) *Attorney, Agent, or Firm* — BIRCH, STEWART, KOLASCH & BIRCH, LLP

(57) ABSTRACT

The invention proposes a mechanical assembly for the transmission of axial forces between two secured parts, at least one of these parts having a portion with outer threading, said assembly further including a nut with inner threading able to cooperate with said outer threading to axially block by tightening the other part relative to the first part and to allow the transmission of axial forces between these two parts. The pitch of the outer threading and/or of the nut (Continued)

vary/varies along the axial dimension of the threading, the space gradually decreasing from the first thread to the rear thread in the expected direction for the axial force.

The variable threading can be produced by chemical etching.

13 Claims, 4 Drawing Sheets

(56) References Cited

U.S. PATENT DOCUMENTS

| | | | | |
|---|---|---|---|---|
| 6,848,724 | B2* | 2/2005 | Kessler | F16L 15/004 285/333 |
| 2001/0002963 | A1* | 6/2001 | Haje | F01D 25/243 403/30 |
| 2012/0020774 | A1* | 1/2012 | Bart | F01D 25/162 415/122.1 |
| 2013/0259599 | A1* | 10/2013 | Benjamin | F16B 33/02 411/366.1 |
| 2014/0021056 | A1* | 1/2014 | Rodriguez Elizondo | G01M 1/34 134/3 |

* cited by examiner

MECHANICAL ASSEMBLY FOR THE TRANSMISSION OF AXIAL FORCES BETWEEN AT LEAST TWO ROTOR PARTS OF A TURBOMACHINE AND METHOD FOR PRODUCING A VARIABLE THREADING FOR SUCH AN ASSEMBLY

The present invention concerns a mechanical assembly for the transmission of axial forces between at least two rotor parts of a turbomachine.

It also concerns a method for producing a variable threading for a threaded shaft portion and/or a nut of such an assembly.

FIELD OF THE INVENTION AND STATE OF THE ART

General Reminders on the Turbomachines

An axial turbofan engine is schematically represented in FIG. 1. The turbofan engine 1 comprises in the air flow direction along the axis of the engine, a fan 2, a low-pressure compressor 3, a high-pressure compressor 4, a combustion chamber 5, a high-pressure turbine 6, a low-pressure turbine 7 and a propulsion nozzle (not represented).

The fan 1 and the low-pressure compressor 3 are connected to the low-pressure turbine 7 by a first transmission shaft 9, while the high-pressure compressor 4 and the high-pressure turbine 6 are connected by a second transmission shaft 10.

In operation, a flow of air compressed by the low-pressure and high-pressure compressors 3 and 4 feeds combustion into the combustion chamber 5. The turbines 6, 7 recover kinetic energy derived from the expansion of the combustion gases before restoring it to the compressors 3, 4 and to the fan 2 via the transmission shafts 9, 10.

Assembly of the Transmission Shafts

The production of the turbofan engines involves a design of the shaft line 9, 10 which ensures the transmission of power from the low-pressure turbine 7 (downstream) to the fan 2 (upstream). It is often necessary to produce this mechanical assembly in several parts for integration and manufacturability issues. These multiple parts having to be linked together by links ensuring the transmission of different forces, a technical solution consisting of a spline-threading tandem is often used where:

The splines transmit the torque of the turbine,
The threading transmits the axial forces.

Referring to FIG. 2, the low-pressure turbine shaft 9 is housed inside a journal 11 which ends the low-pressure compressor shaft 3. The journal 11 and the portion of the shaft 9 which is located at the journal 11 include complementary rectilinear splines 12. These complementary splines 12 ensure the torque transmission between the two parts that constitute the turbine shaft 9 and the shaft of the low-pressure compressor 3.

The transmission of the axial forces between these two parts 9 and 3 is for its part ensured by a threading and nut assembly. For that purpose, the shaft 9 ends with threaded portion 15, whose outer threading cooperates with an inner threaded nut 14. Said nut ensures the tightening of an internal annular bead 3a of the low-pressure compressor 3 against an adjusting wedge 13. Said wedge 13 is itself interposed between said bead 3a and an abutment 9b in the shaft 9 upstream of the splines 12. A lock ring 16 is also provided to ensure the rotational blocking of the nut.

Stresses on the Transmission Shafts

The low-pressure turbine shaft 9 and the shaft of the compressor 3 are very long and subjected to high torques during the operation of the turbojet engine 1.

Within this assembly, the threading plays an essential role by allowing the transmission of axial forces which can reach several hundreds of kN.

The mechanical strength of the threadings is therefore critical because the intensity of the transmitted forces causes very significant stresses on very small areas, in particular in the first thread (area 17 in FIG. 2). This makes the dimensioning of this assembly complicated.

The first thread is therefore generally the most force-loaded while the stresses decrease rapidly in the next threads.

This situation causes rapid wear of the first thread (area 17) and leads to a short lifetime of the parts that must be overdimensioned to achieve the assembly lifetime goal.

Variable Pitch Screw

Variable pitch screws are already known in fields other than that of the turbomachines.

Such screws are for example worm screws used in measuring systems or accuracy machining machines to adjust the functional clearance of the measuring screw and allow maximum accuracy in the axial displacement of the screw when it is rotated.

These are thus systems far from that of the invention, both functionally and dimensionally. Particularly, the screws transmit a movement and not a force and such are not concerned with the transmission of axial forces as large as those that may be encountered in the case of turbomachine rotor parts.

DISCLOSURE OF THE INVENTION

An aim of the invention is to propose a mechanical assembly for the transmission of axial forces between at least two rotor parts of a turbomachine, which allows overcoming the drawbacks of a threaded transmission shaft of a turbomachine.

Particularly, another aim of the invention is to limit the excess mass necessary to ensure the mechanical strength of the thread.

Also an aim of the invention is to propose, in the context of the assembly of turbomachine rotor parts, a solution which improves the distribution of the mechanical stresses on the threaded portions or the engaged nuts and which improves the mechanical strength and the lifetime of said threaded portions and nuts while optimizing the mass.

Yet another aim of the invention is to propose a production method perfectly adapted to the proposed solution.

Thus, according to one aspect, the invention proposes a mechanical assembly including two rotor parts of a turbomachine, one of the parts being a compressor shaft, the other part being a turbine shaft, at least one of these parts being a shaft of the rotor and having a portion with outer threading, said assembly further including, for the transmission of axial forces between these two parts, a nut with inner threading able to cooperate with said outer threading to axially block by tightening the other part relative to the first part and to allow the transmission of axial forces between these two parts. The pitch variation from one thread to another along the axial dimension of the threading is constant.

The pitch of the outer threading and/or the pitch of the nut varies/vary along the axial dimension of the threading, the space between the thread of said outer threading and the thread of the nut gradually decreasing from the first thread to the rear thread in the expected direction for the axial force.

In this way, the stress is no longer supported mainly by the first thread, but is also distributed on the other threads of the threading.

Also, according to another aspect, the invention proposes a method for producing a variable pitch threading of a threaded portion or a nut of such an assembly.

According to this method, the part whose threading pitch must be made variable is gradually immersed in an etching bath.

Such a method has the advantage of allowing much better accuracies than what conventional machining allows.

The invention further concerns a turbomachine including at least two rotor parts assembled by an assembly of the type of the one claimed, said assembly further including a set of splines for the torque transmission between these two parts.

It also concerns an aircraft, characterized in that it includes at least one engine which is a turbomachine of this type.

DESCRIPTION OF FIGURES

Other characteristics, aims and advantages of the invention will emerge from the following description, which is purely illustrative and not limiting, and which should be read in relation to the appended drawings in which.

DETAILED DESCRIPTION OF THE INVENTION

Figure 1:
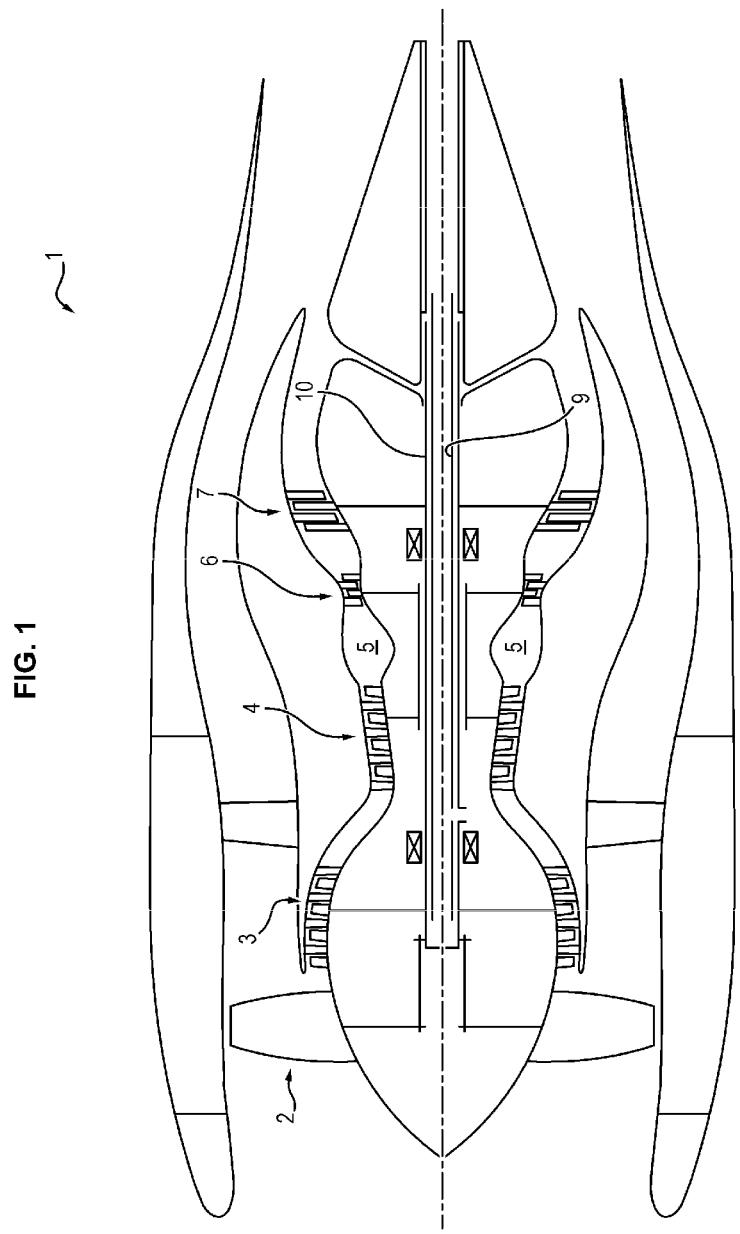
FIG. 1, already described, schematically represents different components of a turbofan engine.

The following considers the general case of a secured threading and nut assembly between two rotor parts of a turbomachine, for example an aircraft turbine engine. This turbomachine is for example, but not limited to, a turbomachine of the type of that of FIG. 1 already described.

The two assembled parts can be rotor parts of any type, particularly, but without limitation, a turbine shaft and a compressor shaft.

Figure 2:
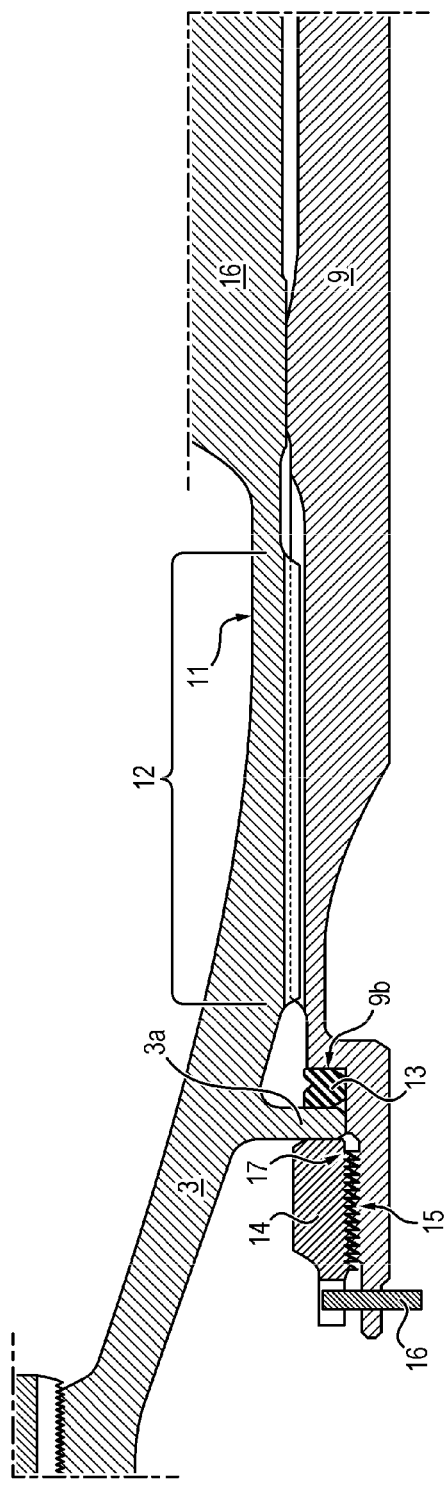
FIG. 2, already presented, is a schematic sectional view of a mechanical assembly between the shaft of a low-pressure turbine and the shaft of a low-pressure compressor of a turbojet engine of the type of the one presented in FIG. 1.

For convenience, references 14 and 15 already introduced in FIG. 2 were used to designate respectively the nut and the threaded portion of such an assembly.

Variable Pitch Threading

Figure 3:
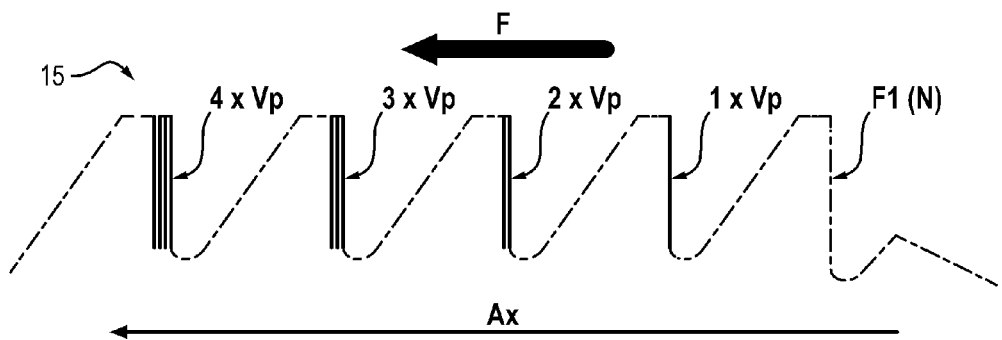
FIG. 3 is a schematic representation illustrating a possible embodiment of the invention.

In the embodiment of FIG. 3, the threaded portion 15 has a pitch which varies along the axial dimension (arrow Ax in the figure) of the threads.

In particular, the thickness of the thread increases along said axial dimension Ax in the direction from which the axial force comes (in this case, in the example in the figure, from downstream to upstream-arrow F). The threads intended to be on the side of the internal annular bead 3a of the low-pressure compressor 3 and of the abutment 9b in the shaft 9 are thinner than the threads intended to be furthest therefrom.

In this way, the space left for the complementary thread of the nut decreases, which allows distributing the force and loading including the "rear" threads.

Thus, when the nut 14 is tightened, the "rear" threads of the threading 15 and of the nut 14 are in contact and are stressed. They take up more force than with a classic design.

For all nut assemblies, there is indeed a functional clearance between the male and female threading. When the tightening takes place, the micro displacement of the nut presses the flanks of the threads against each other simultaneously. The force stream seeks to cover the least distance; it then concentrates the stress in the first threads. In the proposed structure, the clearance at the rear is smaller than at the front, upon tightening, contact is made first on the rear flanks. Thus, the force stream is forced to go around the first threads to load further the rear threads. The front thread is therefore less stressed.

Different profile geometries can be envisaged for the thread of the threading: polygonal, symmetrical or asymmetrical threading.

In the example of FIG. 3, the threading of the represented threaded portion 15 is of the asymmetric trapezoidal type at 45°. Each thread section has:
- a force take-up face (in this case, downstream face) forming a zero angle with respect to the perpendicular to the axis of the threading and
- an opposite face (in this case, upstream face) inclined by 45° with respect to said axis.

This geometry is particularly suitable for producing the variable pitch threading. It allows decreasing the stresses at the thread bottom.

In this example, the pitch of the threading (distance separating the force take-up face of two successive threads after one turn) varies linearly. It decreases from one turn to another by a pitch variation $V_p$. This is what has been illustrated by representations in extra thickness in FIG. 3. Thus, with respect to the first thread along the axial dimension Ax (nominal thread N, in this case located furthest upstream), the force take-up face of the threading is offset:
- by an extra thickness equal to $1 \times V_p$ at the next thread,
- by an extra thickness equal to $2 \times V_p$ at the third thread,
- by an extra thickness equal to $3 \times V_p$ and $4 \times V_p$ at the fourth and fifth threads,
- etc.

Typically, the number of threads of a threading involved in an assembly of rotor parts of a turbomachine is of about ten (greater than eight, for example equal to twelve).

The pitch variation is for example by an order of magnitude of a few micrometers.

In particular, in the case of a shaft with a diameter comprised between 45 and 90 mm (for example on the order of 50 mm), the pitch variation $V_p$ is advantageously comprised between 1 and 5 µm/pitch, preferably greater than 2 µm/pitch, for example equal to 3 µm/pitch or more.

In any event, the pitch variation is less than the tolerance accepted on the pitch of a threading in this type of application, said tolerance being for its part on the order of several tens of µm (the pitch of the threads being for its part on the order of a few tenths of millimeters).

As a variant, the pitch variation $V_p$ may not be constant. The pitch can then decrease in a non-linear manner along the axial dimension Ax of the threading.

The foregoing considered the case where the decrease—in the direction of application of the force—of the space between the threads of the nut and the threads of the complementary threaded portion (in the occurrence, the shaft) is obtained through the variation of the threading of the threaded portion of the shaft.

As a variant, of course, this decrease can be obtained by pitch variation of the threading of the nut or by pitch variation of both the threading of the threaded portion of the shaft and of the threading of the nut.

Production of the Variable Pitch Threading

Different methods can be envisaged for producing the variable pitch threading.

In particular, the variable pitch threading can be produced mechanically.

To achieve the desired accuracies, a production by acid chemical etching is preferred.

Figure 4:
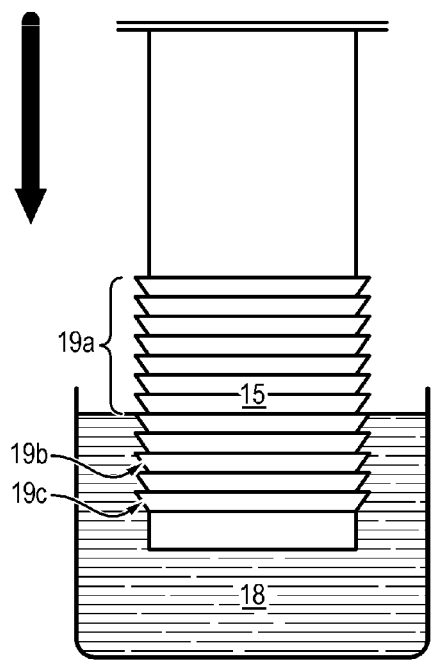
FIG. 4 illustrates a possible production method.

To this end, as illustrated in FIG. 4, the part whose threading must be made variable (part 15 in this case) is gradually immersed in an etching bath 18. The progression speed is adapted to obtain the desired thickness variation on the threads (referenced 19a to 19c).

Each thread 19a to 19c is thus immersed in the bath for a period which is suitable to dissolve the material and gradually remove the desired extra thickness for each thread turn.

The non-immersed threads 19a are at the nominal profile of the initial threaded part.

The intermediate threads 19b are finer than the nominal profile.

The threads 19c remained even longer in the bath are even finer.

For example, in the case of a constant pitch variation, the rate of progression in the acid bath is constant.

Once the rear threads are reached, the part is taken out and rinsed and the outer threading 15 or the nut 14 is dried to remove the chemical residues.

Typically, a mask can be applied on threading areas that are not desired to be stripped during this process. In one embodiment, the mask can be applied on the set of threads of the threaded portion 15, except on the force take-up faces (threads number 1 and 2 of the curves $V_{p1}$ and $V_{p3}$ in FIG. 5).

In this case, the mask is removed after the rinsing step.

Compared to purely mechanical methods, such a chemical etching method has the advantage of allowing better accuracies and of being perfectly mastered industrially.

Modeling—Results

A finite-element modeling study is carried out on a case of the nut threading 14. The 3 following cases are carried out and presented:

A nominal calculation ($V_p$=0 μm/pitch), having the standard threading profile

A calculation with a pitch variation $V_p$=1 μm/pitch.

A calculation with a pitch variation $V_p$=3 μm/pitch.

Figure 5:
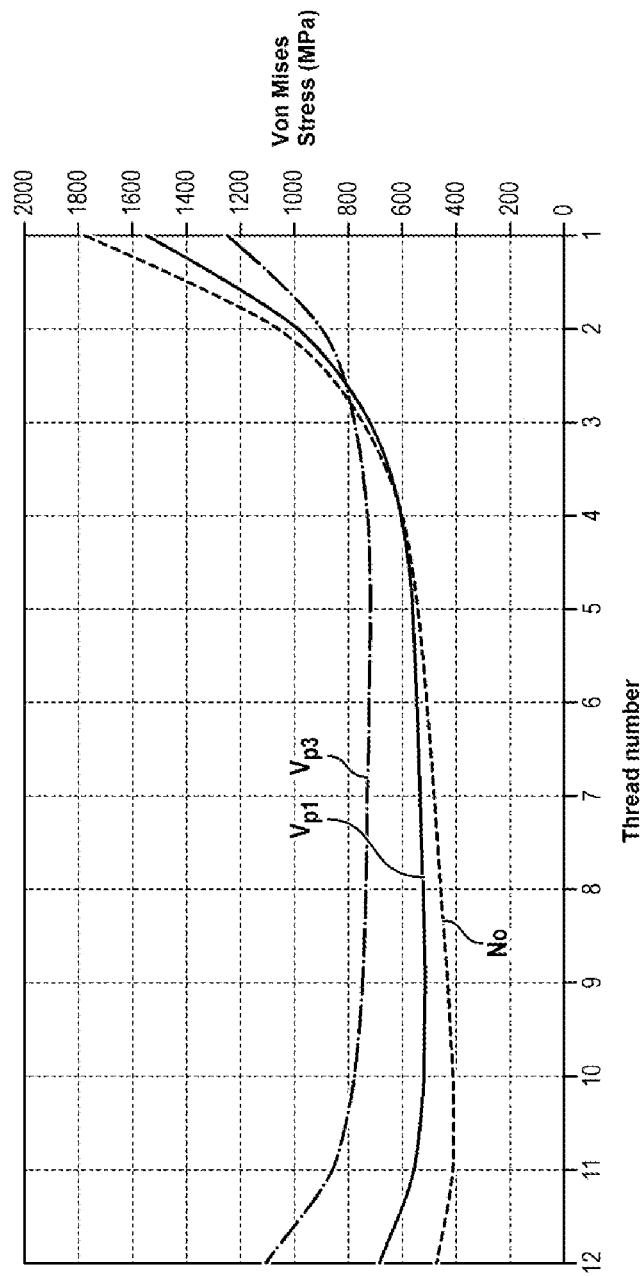
FIG. 5 is a graph which depicts the distribution curves on the one hand in the case of a nominal threading and on the other hand for different pitch variation values.

With reference to FIG. 5, the distribution of the Von Mises stresses in MPa is presented depending on the thread number, according to the pitch variations (nominal t pitch thread (curve No), pitch variation equal to $V_p$=1 μm/pitch (curve $V_{p1}$), pitch variation equal to 3 μm/pitch (curve $V_{p3}$).

The changes in the stresses are the most significant for the first thread (thread F1 of normalized profile N): the stresses decrease when the pitch variation is increased (along the axis Ax): 1776 MPa for the nominal case, 1550 MPa for 1 μm/pitch, 1249 MPa for 3 μm/pitch. This decrease in the stresses presents a 30% reduction of the stresses withstood by the first thread when the case of 3 μm/pitch is compared with the nominal case.

The threads numbered between 2 and 11 withstand for their part more stresses when the pitch variation is higher.

For the nominal case, the stress withstood by the thread number 2 is at 1,080 MPa and the one withstood by the thread number 10 is at 400 MPa. The stress value stagnates between the thread number 10 and 11.

For a pitch variation of 1 μm/pitch, the decrease takes place between the thread number 2 (1,000 MPa) and the thread number 9 (500 MPa). A slight increase of the stresses is observed between the thread number 9 and the thread number 11 (560 MPa).

For a pitch variation of 3 μm/pitch, the stress is almost constant: around 900 MPa from thread 2 to thread 11.

Thus, a constant pitch variation of 3 μm/pitch allows better distributing the stresses over the set of threads compared to the nominal case.

This allows improving the strength of the threads and the lifetime of the assembly.

It will also be noted that this better distribution of the stresses also allows being more predictive when analyzing the mechanical strength of the threading and the lifetime thereof.

The proposed production method furthermore has for its part the advantage of allowing decreasing the non-conformities that are not acceptable in production (more robust manufacturing).

The invention claimed is:

1. A mechanical assembly including two rotor parts of a turbomachine, one of the two rotor parts being a compressor shaft, another of the two rotor parts being a turbine shaft, at least one of said two rotor parts having a portion with an outer threading, said assembly further including, for transmission of axial forces between said two rotor parts, a nut with an inner threading able to cooperate with said outer threading to axially block by tightening the other of the two rotor parts relative to the first of the two rotor parts and to allow transmission of axial forces between said two rotor parts, wherein a pitch of the outer threading and/or a pitch of the nut varies/vary along an axial dimension of the threading, a space between a thread of said outer threading and a thread of the nut gradually decreasing from a first thread to a rear thread in an expected direction for the axial force, wherein the thickness of the thread of the inner threading increases along the expected direction for the axial force such that a pitch variation from one thread to another along the axial dimension of the threading is constant, the thickness of the thread of the inner threading being measured along the axial dimension of the threading and the expected direction for the axial force.

2. The assembly according to claim 1, wherein the variable pitch threading has an asymmetric trapezoidal section at 45°.

3. The assembly according to claim 1, wherein the pitch variation from one thread to another is less than a tolerance on the threading pitch.

4. The assembly according to claim 1, wherein the threaded portion has a diameter comprised between 45 and 90 mm and in that the pitch variation $V_p$ is comprised between 1 and 5 μm/pitch.

5. The assembly according to claim 4, wherein the pitch variation is greater than 2 μm/pitch.

6. The assembly according to claim 1, wherein the rotor part having a portion with an outer threading is a compressor shaft, while the other rotor part is a turbine shaft.

7. A method for producing the variable pitch threading of the threaded portion or a nut of an assembly according to claim 1, wherein the part whose threading pitch must be made variable is gradually immersed in an etching bath.

8. The method according to claim 7, wherein a rate of progression in the etching bath is constant.

9. A turbomachine, wherein at least two rotor parts are assembled by an assembly according to claim 1, said assembly further including a set of splines for torque transmission between said two rotor parts.

10. An aircraft, wherein it includes at least one engine which is a turbomachine according to claim 9.

11. The mechanical assembly according to claim 1, wherein the expected direction for the axial force is from downstream to upstream.

12. The mechanical assembly according to claim 1, wherein the pitch variation allows the space left for the complementary thread of the nut decrease.

13. The mechanical assembly according to claim 1, wherein the outer threading and/or the nut comprises n threads and wherein the threading thickness increases such that each thread starting at the second thread has an extra thickness compared to the previous thread which is equal to $(n-1) \times V_p$, wherein $V_p$ is the pitch variation.

* * * * *